US006739804B1

(12) United States Patent
Haun

(10) Patent No.: US 6,739,804 B1
(45) Date of Patent: May 25, 2004

(54) SCR TOP CONNECTOR

(75) Inventor: Richard David Haun, Katy, TX (US)

(73) Assignee: OPE, Inc., Houston, TX (US)

( * ) Notice: Subject to any disclaimer, the term of this patent is extended or adjusted under 35 U.S.C. 154(b) by 0 days.

(21) Appl. No.: 09/980,852

(22) PCT Filed: Apr. 20, 2000

(86) PCT No.: PCT/US00/10938

§ 371 (c)(1),
(2), (4) Date: Oct. 22, 2001

(87) PCT Pub. No.: WO00/63598

PCT Pub. Date: Oct. 26, 2000

Related U.S. Application Data
(60) Provisional application No. 60/130,579, filed on Apr. 21, 1999.

(51) Int. Cl.[7] .................................................. F16L 1/26
(52) U.S. Cl. .................... 405/195.1; 405/158; 405/169; 405/224.3; 166/355
(58) Field of Search .............................. 405/169, 168.1, 405/202, 195.1, 224.3, 223.1, 224, 224.2; 166/355, 359; 114/265

(56) References Cited

U.S. PATENT DOCUMENTS

| 3,692,337 A | 9/1972 | Mischel |
| 3,952,526 A | 4/1976 | Watkins et al. |
| 4,105,266 A | 8/1978 | Finney |
| 4,759,662 A | 7/1988 | Peppel |
| 5,269,629 A | * 12/1993 | Langner .................. 405/195.1 |
| 5,615,977 A | * 4/1997 | Moses et al. ............ 405/195.1 |
| 5,628,586 A | 5/1997 | Arlt, III |
| 5,791,695 A | 8/1998 | Snider |
| 5,951,061 A | * 9/1999 | Arlt, III et al. ................ 285/94 |

* cited by examiner

Primary Examiner—Heather Shackelford
Assistant Examiner—Sunil Singh
(74) Attorney, Agent, or Firm—Madan, Mossman & Siram, P.C.

(57) ABSTRACT

A mechanical joint assembly for a steel catenary riser (SCR) is disclosed. The lower section of the mechanical joint assembly is comprised of steel or alternate high strength components, rather than elastomers to absorb the high loads and increase life of the unit. The lower mechanical joint assembly provides for reduction of bending moments and resulting fatigue stresses at the SCR top by removing resistance to movement in all angular directions, providing increased lateral and in-plane angles to provide increased construction tolerances for the pipeline approach corridor. Pipeline approach angle increase is accommodated by providing dual orthogonal trunnions in addition to an axial swivel. The upper mechanical joint assembly, acting without riser tension loads, allows for the use of either flexible high-pressure pipe or swivel arrangements to accommodate angular flexure before the rigid deck piping. As a system, the mechanical joint assembly provides for upstream and downstream valving for safety and maintenance without decreasing the fatigue life of SCR's.

20 Claims, 12 Drawing Sheets

SCR TOP CONNECTOR

The present application is a § 371 of PCT/US00/10938 filed Apr. 20, 2000, which claims the benefit of U.S. Provisional Patent Application Serial No. 60/130,579 filed Apr. 21, 1999.

FIELD OF THE INVENTION

The invention relates to an SCR Top Connector Assembly for the articulating connection of a conduit, such as an offshore flowline or pipeline used in the petroleum industry, to a foundation subjected to differential motions of the conduit and structure. More particularly, this invention relates to a subsea pipeline with significant unsupported length, termed a "steel catenary riser" (SCR), which would utilize the SCR Top Connector Assembly to connect the SCR to a fixed or floating structure, including several parts that work together to provide fluid communication from the SCR to the platform piping system, to allow dynamic and relative motions of the SCR and the structure.

BACKGROUND

In the offshore oil and gas sector, recent developments in deeper water depths have demonstrated the need for improved solutions for the economic attachment of a flowline, or pipeline, to a structure, whether fixed or floating. Initial development utilized flexible pipe from the seabed to the floating platform; however, many operators have begun to favor the potential safety and savings offered by the use of steel catenary riser (SCR) configurations, wherein the pipeline is suspended for some distance off the seabed and connected to the structure, or floating platform.

The prior art assembly of SCR flexible joints greatly limit the approach corridors of flowlines due to the degree of dynamic angular movement that can be accommodated. Manufacturing and installation tolerances offshore in deep water leave little dynamic allowance in the prior art once the static offset of floating vessels are included. The angular limits of the prior art assembly pose difficulties for the design and construction engineers of offshore pipelines to ensure that the installation tolerances, fabrication tolerances, and operational conditions will not exceed the limits of the flexible joint and potentially lead to failure of the SCR. If the limits of the flexible joint are exceeded, all flexibility is lost and the SCR is exposed to very large bending moments resulting in dramatically and unpredictably shortened fatigue life, thereby leading to possible failure of the SCR below the flexible joint near the platform. Failure of an SCR in petroleum gas service or an SCR connector component without a viable safety shutdown valve would pose a very high risk of fire and loss of life as the gas in the pipeline (extending frequently 60 miles from the host platform) would be released at the base of the manned structure which contains sources of ignition. Although a gas leak may be more hazardous, failure of a SCR in petroleum liquid service would lead to a fairly large oil spill in open water since much of the oil in the pipeline would be siphoned out of the pipeline by the low pressure wake of the SCR falling to the seabed. Additionally, the oil would be expelled by expanding gases within the oil, as well as normal molecular diffusion.

It is an object of this invention to have features which greatly increase safety over present art by eliminating a risk of gas leakage at an offshore platform by allowing the use of normal and proven safety valves. This reduces the potential for fire, and eliminates potential oil leakage into seawater when used with oil lines. Current SCR flexible joints utilize elastomeric and metal laminations, which provide pressure containment. The same elastomeric materials serving as seals must absorb the full SCR vertical reactions while repeatedly being deflected under high vertical loads. The vertical loads can reach 100 tons due to the suspended riser weight, motions of the SCR subjected to continual environmental loading, and relative platform movements. Under cyclic loading, the elastomeric elements containing the fluids, under various conditions of temperature and pressure, may likely become a path for gas or oil leakage which would result in oil contamination of the surrounding seawater or leakage of gas at the base of the offshore platform. This would cause a gas plume and a risk of sinking the floating vessel or risk of fire to the structure overhead. If a semi-submersible were to sink at a corner, it would likely lose tendons and capsize. The industry considers systems with moving elastomeric parts to have maintenance or replacement requirements at some point in time and therefore leakage considerations are valid considerations with elastomers subjected to high cyclic compressive and shear loads acting as the sole safety barrier under pressure. Although platform piping valves can be closed on the platform side in the present art flexible joint, it is presently not considered possible to provide a safety block valve below the prior art flexible connector due to the high axial loads and high bending moments at the top of the SCR. These loads would be extremely taxing to the integrity of the valve and would not be a reliable safety feature.

A lower block valve, though not practical with present (prior art) equipment, would prevent elastomer leakage from causing the entire pipeline or SCR from back-flowing gas into the platform creating an uncontrollable hazard to life of platform personnel. In fact, the bending moments and related stresses are so high in the top section of the SCR, below the flexible connector, that specially fabricated tapered 'stress' joints are required to minimize the stress concentration factors in these installations. The stress intensification values are primarily due to the high bending moments resulting from the flexural high stiffness of the prior art SCR Top Connector to which the SCR is connected. The high bending moments are primarily a result of the high rotational stiffness of the laminated elastomeric elements being deflected laterally in shear while under high compression loads.

The replacement, or leakage failure correction, of the elastomers within the prior art assemblies is essentially impossible by the platform crew or by means that can be flown offshore to the site, or otherwise be effected in a short duration to reduce a prolonged platform hazard. It is a further object of this invention to eliminate elastomers from the multiple role duties of high load absorption, flexural cycling, and high-pressure containment of petroleum liquids and gases.

To correct fluid leakage of the prior art assemblies, it is necessary to remove the SCR and its associated pipeline from service by shutting in the platform and purging the section in order to provide a safe repair environment. It is also necessary to employ the use of costly offshore deep-water service equipment with sufficient lifting capacity to remove and re-attach a new assembly since the elements are not able to be replaced by the platform crew in a timely fashion in the prior art assemblies.

Prior art is described in part by the following patents:

U.S. Pat. No. 3,692,337 Flexible Coupling, Mischel; Howard T., San Diego, Calif. Sep. 19, 1972.

U.S. Pat. No. 3,952,526 Flexible Supportive Joint for Subsea Riser Flotation, Watkins; Bruce J., Rancho Palos Verdes, Calif. Apr. 27, 1976.

U.S. Pat. No. 5,791,695 Flexible Joint for Facilitating Bending of Tubular, Snider; David A., Hurst, Tex. Aug. 11, 1998.

U.S. Pat. No. 5,615,977 Flexible/Rigid Riser System, Moses; Charles J., Alvarado, Tex. Apr. 1, 1997.

U.S. Pat. No. 5,628,586 Elastomeric Riser Tensioner System, Arlt, III; Edward J., Arlington, Tex. May 13, 1997.

U.S. Pat. No. 4,105,266 Laminated Bearing with Plural Modulus Layer, Finney August 1978.

U.S. Pat. No. 4,759,662 TLP Marine Riser Tensioner, Peppel July 1988

It is a further object of the present invention to minimize the potential for fire risk and loss of life; oil spills, uncontrolled and extended leakage, high maintenance costs and pipeline/platform downtime duration.

It is another object of the present invention to provide a system with automatic shut-in safety block valve capability on each side of any non-metallic elements which may be subject to leakage.

It is a further object of the present invention to increase the allowable dynamic displacement angles to reduce the chance of bottoming out and causing premature SCR fatigue failure.

It is an additional object of the present invention to minimize the high stress levels which occur at the base of the prior art flex joint to eliminate the needs for specially fabricated tapered stress joints and provide extended fatigue service life of the SCR by reducing the top section fatigue moments.

It is yet another object of this invention to isolate the high loads due to the suspended risers from acting on flexible or elastomeric elements.

It is also an object of this invention to use load isolated swivels which convert pendular motions to rotary motion and allow system use when pressure and diameter restrictions prevent the safe use of flexible pipe.

It is also an object of the present invention to provide external means of dynamic high-frequency damping.

It is also an additional object of the present invention to allow essentially unlimited pipeline approach angle to the pre-installed attachment of steel catenary risers on platforms.

SUMMARY OF THE INVENTION

The present invention includes a mechanical joint assembly in which the load-absorbing base is composed of steel or alternate high strength components, providing a higher level of safety and spill prevention than is offered by prior art. The present invention further provides for the use of valving upstream and downstream of the only non-metallic maintenance item(s) without decreasing fatigue life. The present invention also reduces bending moments and resulting fatigue stresses at the SCR top by removing resistance to movement in all angular directions, with increased lateral angles to provide increased construction tolerances for the pipeline approach corridor. The present invention allows the use of increased angles of in-plane dynamic motion with elimination of large vertical SCR supported weight reactions from acting on elastomeric components.

The safety requirement, of preventing uncontrolled back feeding of the pipeline or SCR and thus averting fire and loss of life, is achieved by absorbing all reactions of the SCR prior to subjecting elastomers to pressure containment requirements. By isolating the high loads, downstream and upstream, remote or manual-operated, shut-off valves can be provided to fully isolate any leak within a short section without sacrifice of the system fatigue life. Preventing any block valve from absorbing the high SCR environmental reactions minimizes the chance of valve leakage or malfunction.

The long service outage and high maintenance costs are eliminated by providing the above noted block valves, limiting possible maintenance items to simple diver replacement components without the need for any offshore service vessels.

The present invention therefore separates the design requirements of high load control and that of allowable motion and flexure. The separation point may involve several means, which are described herein along with more specific details of the preferred embodiments.

In the preferred embodiment, increasing the allowance for the pipeline approach angles is accommodated in the lower base by providing dual orthogonal trunnions in addition to an axial swivel to compensate for installation rotational misalignment. A comparison can be made between the present invention and that of the prior art: when the normal construction tolerances are subtracted from the systems three to four times greater allowable dynamic angles are achieved by the proposed system than when compared to the prior art. This increase greatly reduces the chance of exceeding the flexure rates associates with high stress levels when pressure limits are exceeded.

Doubling the load carrying capacity is achieved in the present invention by providing a robust design with heavy cross sections and gradual section transitions in the base to minimize stress levels and, stress intensification factors, thereby providing improved fatigue resistance and load handling.

Elimination of specially prepared tapered stress joints is achieved by the omission of elements which resist the angular motion of the SCR by high-bending moments, as is in the case of the prior art assembly, and the substitution of either low friction, higher-paired pivot systems, bearings, bushings, low-friction coatings, or ultra smooth surfaces. Systems above the base are provided to absorb the angular rotation without tensile loading and with low rotational stiffness.

The Top Connector Assembly may include an optional damping system to curtail high frequency motion. The damping system is subjected to the high SCR reactions and may be maintained, or replaced, without shut-in of the system by a diver and small platform-mounted equipment. Because the fluid medium for damping may be seawater, or other benign fluids, failure of the system in any way does not constitute an emergency. The maintenance could include only the installation of a new damper.

The benefits afforded by the objects of this invention, as defined, clearly address safety concerns of the prior art devices and increase the operational limits and reliability by allowing greater SCR motions with less constraint while eliminating present concerns of installation tolerances. These features in turn allow for measurably larger SCR storm-induced dynamic movement angles with safety.

The assembly of the preferred embodiment of the present invention is composed of several principal parts which make up the load absorbing base and the flexible assembly:

(A) A pressure carrying body which is attached to the uppermost portion of the SCR riser. This component incorporates a pair of male trunnions, which are structurally connected to the pressure containment body and located at opposite sides of the pressure-carrying body, which is an extension of the SCR pipe. The trunnions include features of higher paired rolling motion that provide essentially frictionless motion. Alternate arrangements when friction is less significant due to light SCR reactions include bearings, or lubricated bushings for the trunnions. Rotary motion of the pressure containment body is provided by interior coatings or other means to prevent locked-in torsional stresses during installation;

(B) A trunnion adapter, which consists of a female trunnion on the interior surface, which mates with the pressure containment body and additionally contains a second "outer" male trunnion pair, as described above, located on the outer surface and on an orthogonal plane (a perpendicular plane) to the interior trunnions;

(C) A foundation receptacle that is attached to a foundation of the structure and accepts the outer surface trunnion pair of the second part. The trunnions act in the principle of a universal joint and allows movement in any angle;

(D) Rounded-knife edge pivot, bearings, or bushings may be utilized to provide for rotation of the trunnions to reduce the friction to the degree required for the application;

(E) An optional damper, which can be utilized to absorb high frequency motions and prevent resonance of an undesirable mode due to dynamic excitation of the environment may be included in the assembly as a system approach solution;

(F) A series of swivels converting pendular to rotational motion, flexible pipe, or other means of the prior art, is incorporated into the assembly above the load absorbing base to provide flexure. The load requirements for the swivels and/or flexible pipe are significantly lower because the external loads have been absorbed by the trunnion assembly and associated components;

(G) The swivel or flexible pipe assembly may be preferentially protected at each end with automatic or manual valving at the upstream and downstream ends for automatic and manual shut-in safety without compromising the fatigue life of the system.

BRIEF DESCRIPTION OF THE DRAWINGS

For a further understanding of the nature and objects of the present invention, reference should be made to the detailed description of the preferred embodiment which references the following drawings of which like parts are given like reference numerals and wherein:

FIG. 8 depicts an optional damper assembly of the preferred embodiment of the present invention having three views.

FIG. 11b is an end view of the rotary seal shown in FIG. 11a;

FIG. 11c is a cross-sectional cutaway taken along lines A—A in FIG. 11a;

DETAILED DESCRIPTION OF THE PREFERRED EMBODIMENTS

Figure 1:
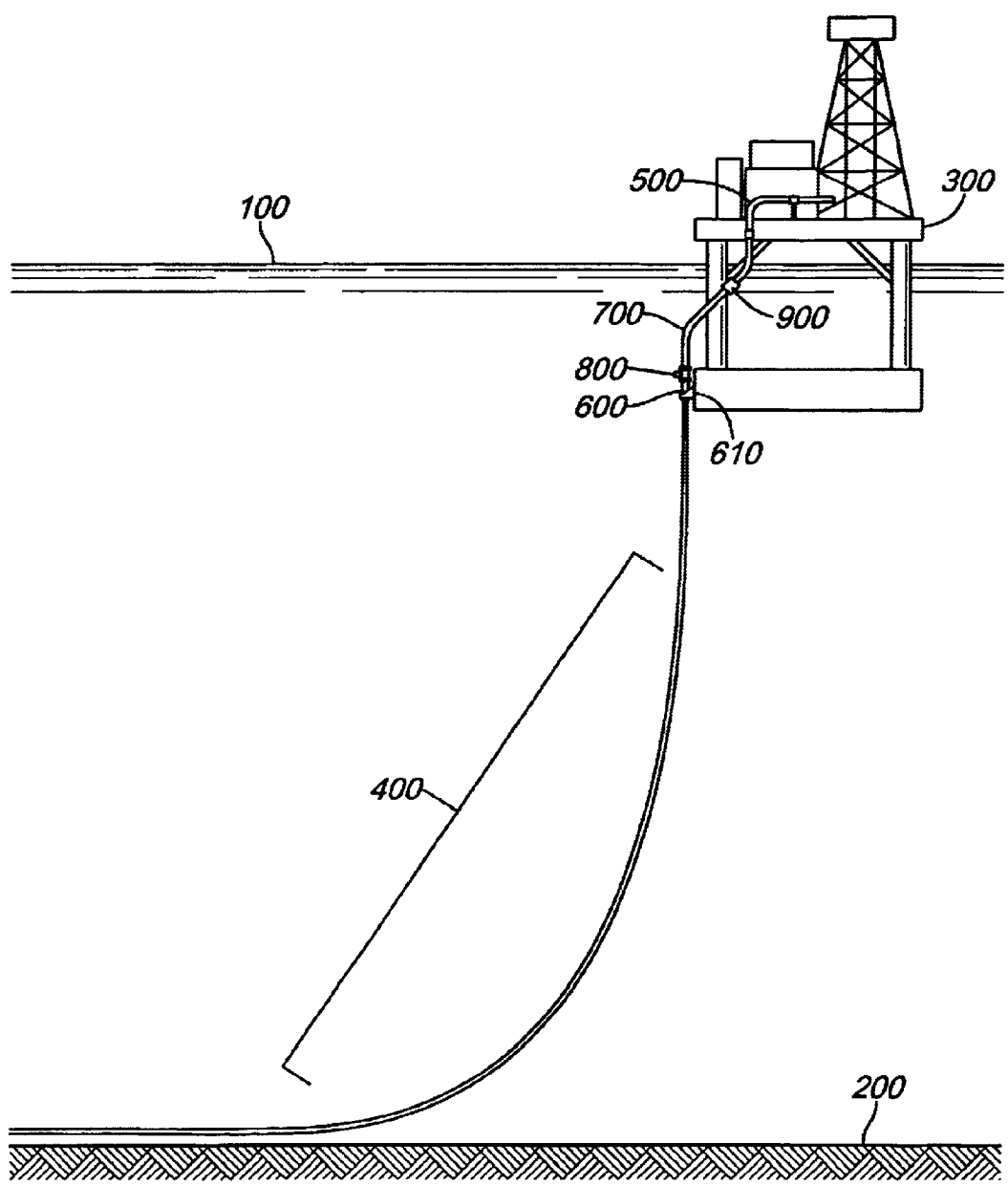
FIG. 1 depicts a typical SCR application showing the major elements of the present invention with use of a flexible pipe as the flexible assembly.
Figure 1A:
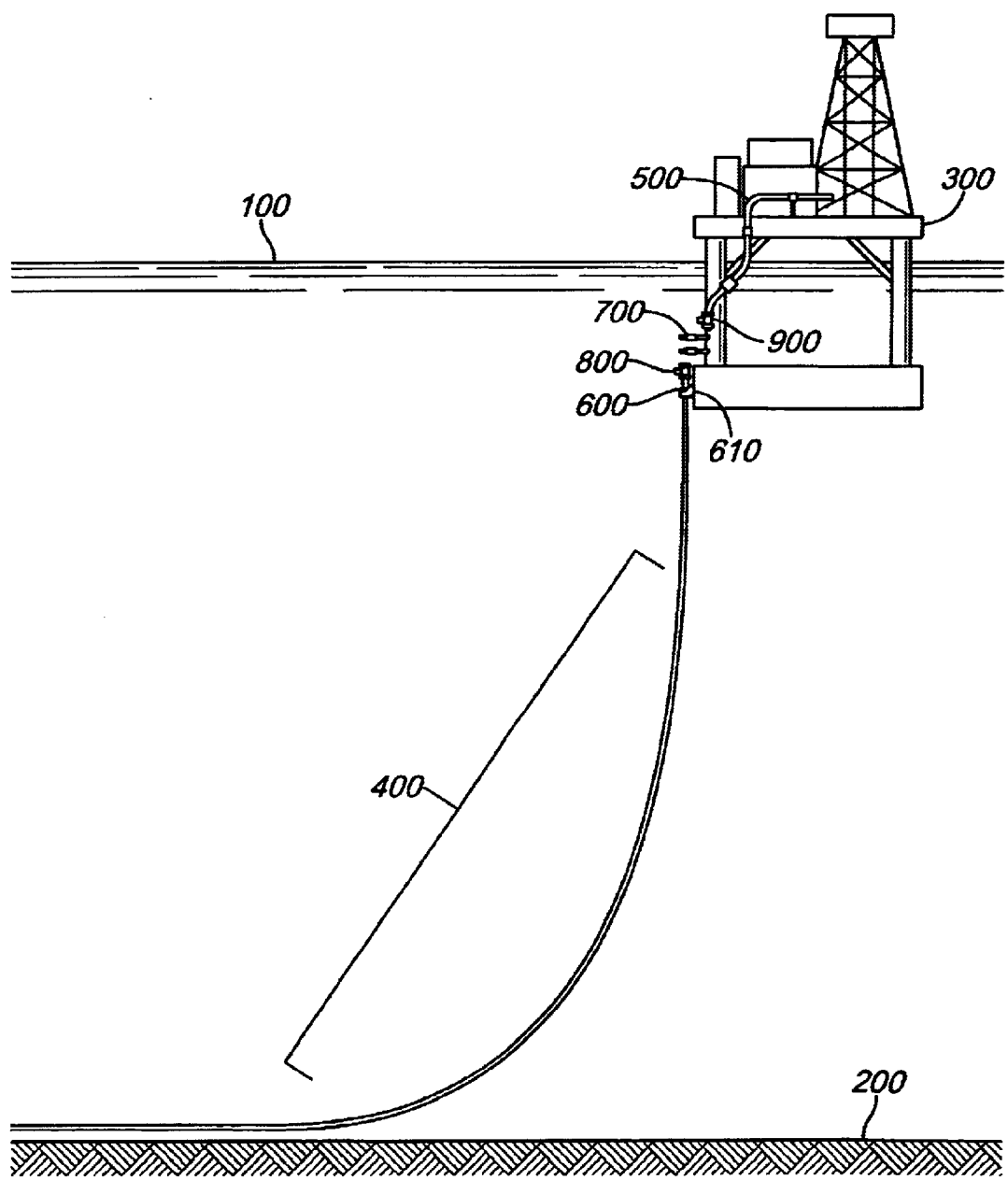
FIG. 1a depicts a typical SCR application showing the major elements of the present invention with use of a rotary swivel system as the flexible assembly.

The SCR application is depicted in FIG. 1 wherein the water surface 100 supports the floating structure 300 above the seabed 200. The floating structure 300 is connected to the seabed pipeline by the steel catenary riser (SCR) 400 connected to deck piping 500 by the Top Connector Assembly 600. The Top Connector Assembly 600 connects the SCR 400 to the deck piping 500 via the lower valve 800 which is connected to one end of a Flexible Assembly 700. In FIG. 1, the Flexible Assembly is composed as a flexible pipe. The other end of Flexible Assembly 700 is connected to a topsides closure valve 900. FIG. 1A depicts the Flexible Assembly to be composed of a rotary swivel system configured to absorb the translation and pendular motions of the lower valve 800 as in the case of large diameter and high-pressure risers.

Figure 2:
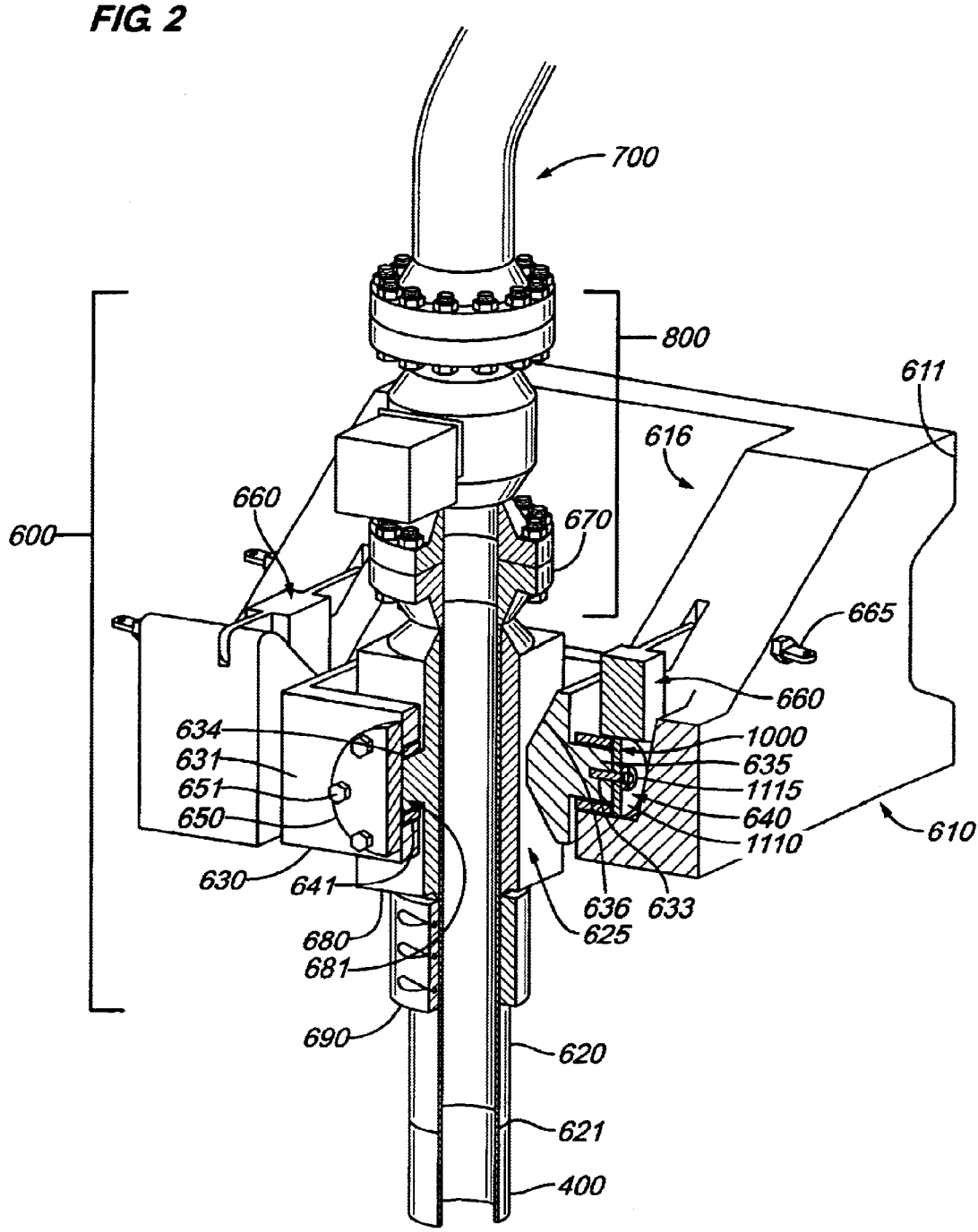
FIG. 2 depicts a cut away view of the SCR Top Connector Load Absorbing Base of the preferred embodiment of the present invention, denoting the principle components and indicating the magnitude of allowable motions.

The preferred embodiments of the present invention, as shown in FIG. 2, use a universal type joint SCR Top Connector Assembly 600 Load Absorbing Base, which is attached to the floating structure 300 via the foundation support 610. Top Connector Assembly 600 includes a pressure containing SCR extension 620, which connects the SCR riser 400 for fluid connection to the deck piping 500. SCR riser 400 is connected to the pressure containing SCR extension 620 by welding 621 or other appropriate mechanism. A trunnion adapter 630 or outer trunnion forms an intermediate structure between an inner trunnion 625 of the SCR Top Connector Assembly 600 and the foundation support 610. A bearing assembly 640 is mounted to the orthogonal trunnions of the outer trunnion assembly 630. The pressure containing SCR extension 620 trunnions are depicted with a bearing assembly 641 option covered by a cover plate 650.

A remote operated vehicle, or ROV, or other diver-friendly retainer 660 is shown in the closed position. The retainer 660 retains the trunnion bearing assembly 640 in the foundation support 610. The retainer 660 prevents the trunnion adapter or outer trunnion assembly 630, and hence the SCR Top Connector or swivel assembly 600, from being moved out of the foundation support 610.

Figure 3A:
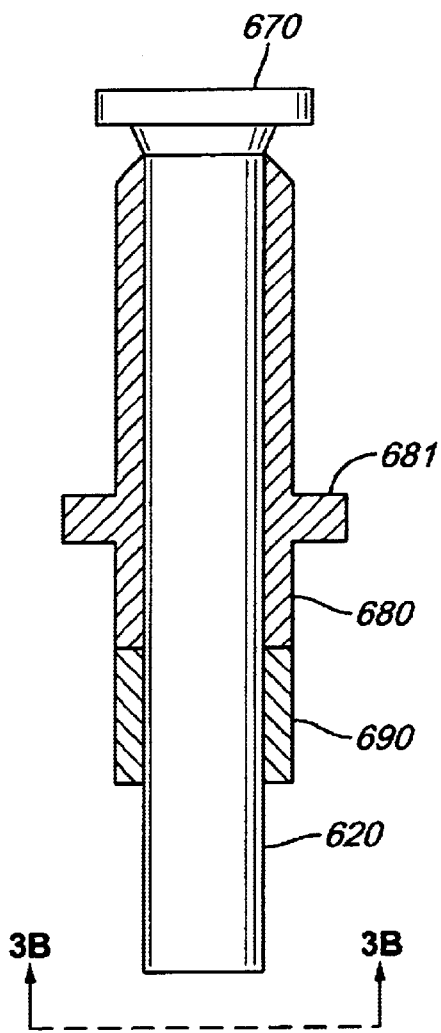
FIG. 3A depicts the SCR pressure carrying extension with the inner trunnions of the preferred embodiment of the present invention.
Figure 3C:
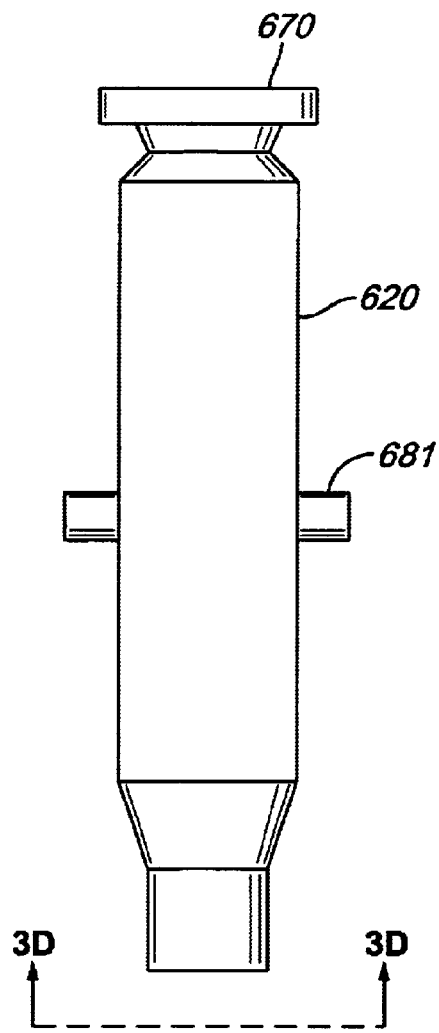
FIG. 3C depicts an alternate embodiment of the SCR pressure carrying extension.

FIG. 3A details a portion of the embodiment shown in FIG. 2. Three pieces, SCR extension assembly 620, inner trunnion housing 680 and collar 690, are shown in FIG. 3A. For assembly, inner trunnion housing 680 slides over the outer surface 671 of SCR extension assembly 620 and is held in place by collar 690, also surrounding surface 671 and bolted by bolts 691 to SCR extension assembly 620.

Figure 3B:
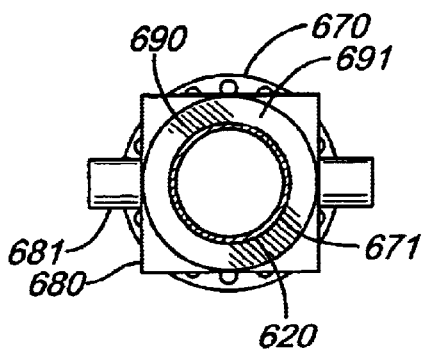
FIG. 3B is an end view of the carrying extension shown in FIG. 3A.
Figure 3D:
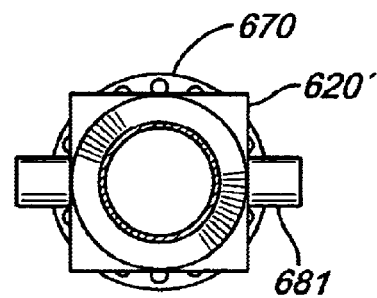
FIG. 3D is an end view of the carrying extension shown in FIG. 3C.

FIG. 3B illustrates a variation of the SCR extension assembly 620. In FIG. 3A, the upper flange 670 is shown connected to a SCR extension assembly 620 with a trunnion 681 extending from an inner trunnion housing 680, such as by casting, thereby allowing axial rotation in one plane. The inner trunnion housing 680 is free to rotate around the axis of SCR extension 620 because pressure containing SCR extension assembly 620 is not welded or otherwise connected directly to inner trunnion assembly 680 but is merely juxtaposed to it freely permitting the rotation of inner assembly 680 around the axis of SCR extension 620 (FIG. 3A). The vertical movement of the SCR extension assembly 620 is restricted by the collar 690 (FIG. 3A), which is attached to SCR extension 620 by bolting 691 or other appropriate means. Alternatively (FIG. 3B), the upper flange 670 may be connected to a sufficiently thick pressure retaining segment 620' which incorporates the inner trunnion 681 as an integral component without a separate trunnion assembly 680 or collar 690, although rotation is thus eliminated in this case for the SCR extension relative to the inner trunnion 680, as in FIG. 3A.

Figure 4A:
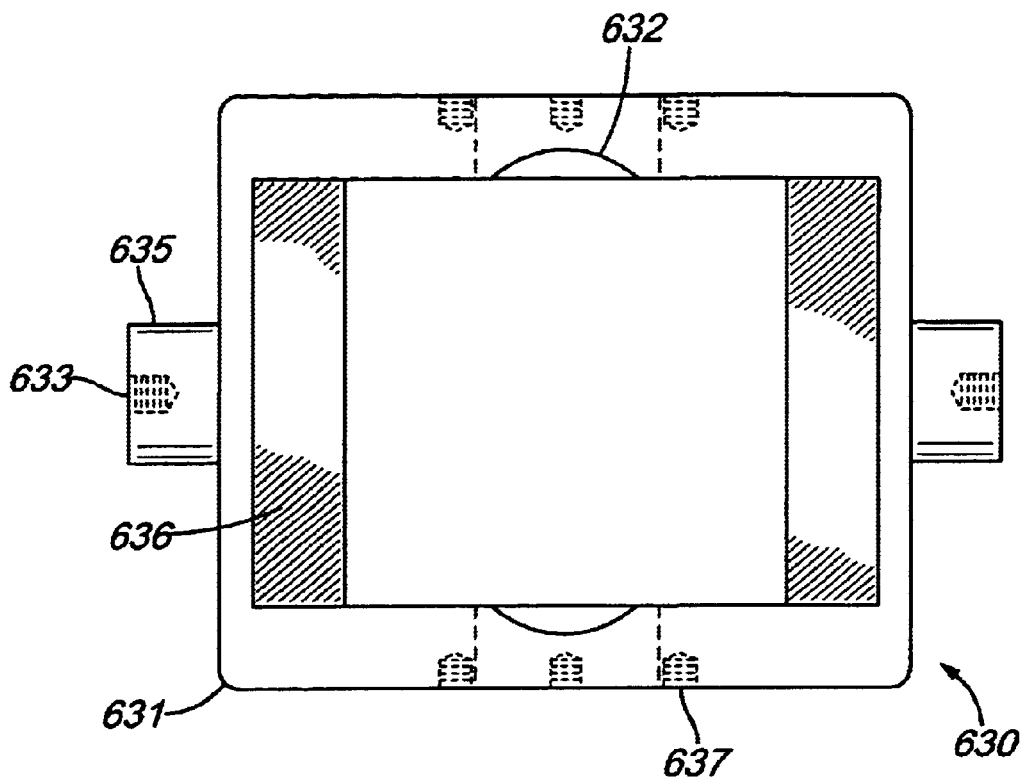
FIG. 4A depicts the top view of the outer trunnion adapter of the preferred embodiment of the present invention.
Figure 4B:
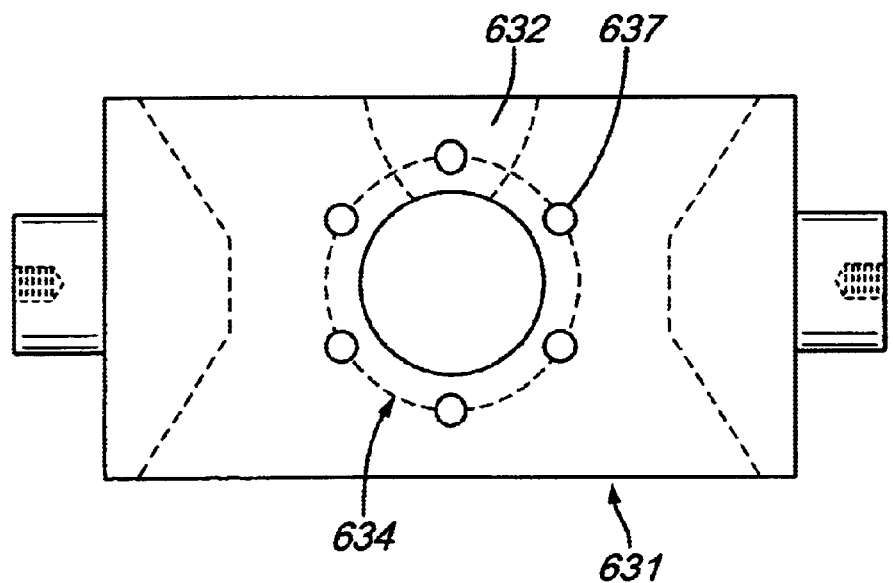
FIG. 4B depicts the side view of the outer trunnion adapter of the preferred embodiment of the present invention.

FIGS. 4A and 4B show the details of the trunnion adapter or assembly 630, which transmits forces to the foundation support 610 from the SCR riser extension assembly 620. Trunnion adapter 630 comprises external support or outer structural envelope 631 having reliefs 632 cast or otherwise machined therein. Reliefs 632 are sized to receive trunnion 681 (FIGS. 3A and 3B) to be received in reliefs 632. External support 631 further includes clearance relief surfaces 636, permitting rotation on the opposite axis. In addition, external support 631 includes trunnion 635 having an inner threaded bore 633 partly formed therein. In addition, flange bolt holes 637 are also formed in 631 to receive flange 650 (not shown in FIG. 4, but see FIG. 2) held in place by bolts 651 (FIG. 2) threaded into opening 637. To accommodate trunnions 681, openings 634 are formed in external support 631 as shown in FIG. 4B for the insertion of trunnion 681 into openings 634 to be held in place by bearings 641 (FIG. 2).

Figure 5A:
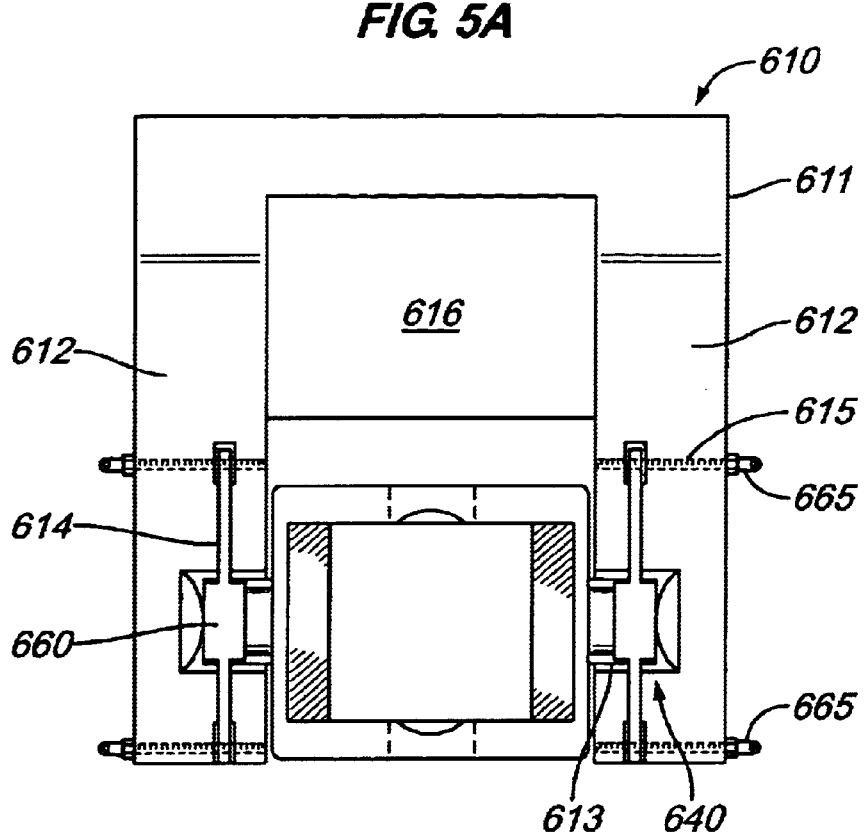
FIG. 5A depicts the plan view of the foundation receptacle of the preferred embodiment of the present invention with installation of SCR attached top connector components partly in phantom line.
Figure 5B:
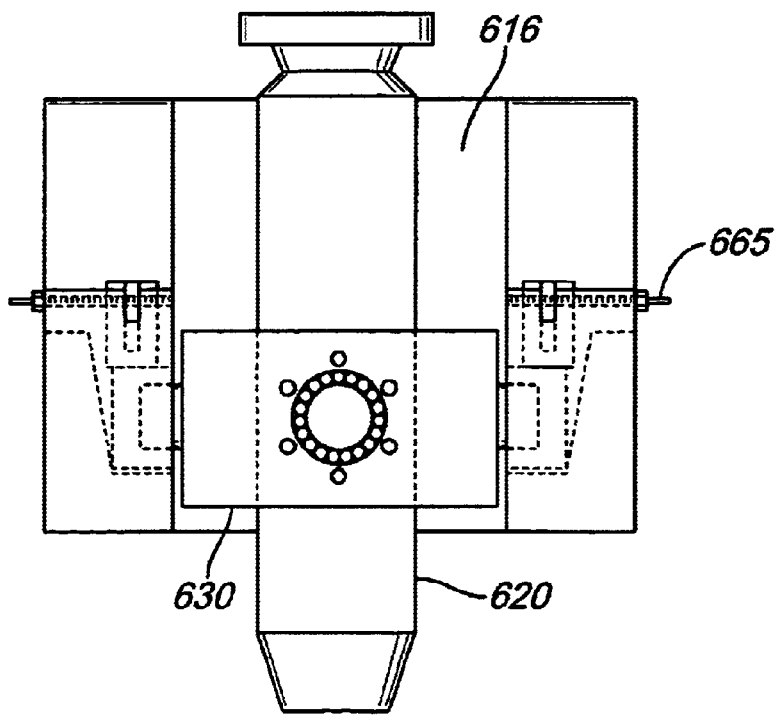
FIG. 5B depicts the front view of the foundation receptacle of the preferred embodiment of the present invention.
Figure 5C:
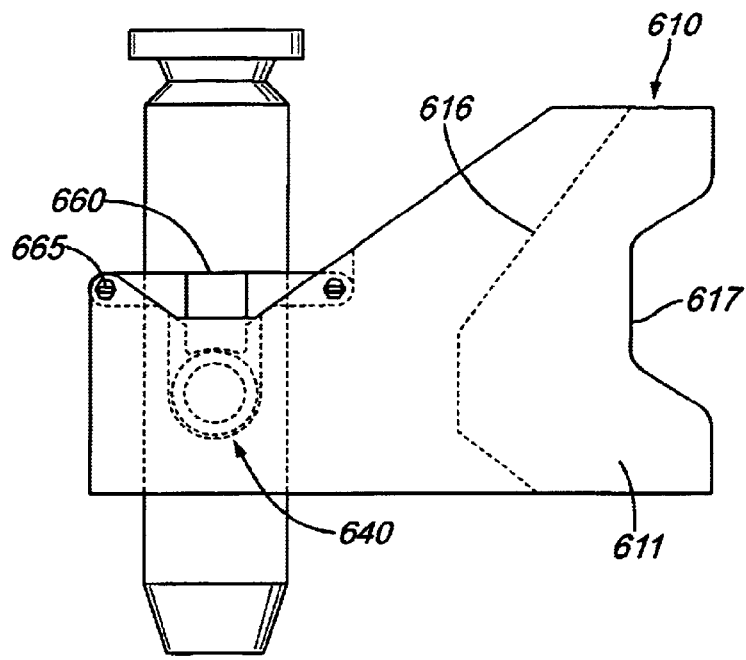
FIG. 5C depicts the side view of the foundation receptacle of the preferred embodiment of the present invention.

Details of the foundation support 610 are shown in FIGS. 5A–C. Foundation support 610 accepts the outer trunnion adapter 630 and thereby restrains the SCR extension 620 to the floating or fixed structure 300 (FIG. 1). Foundation support 610 is generally horseshoe or foundation-friendly shaped, having back support 611 and two parallel extensions or lateral supports 612 farthest from support 612 extending orthogonally from back support 611. The ends of lateral supports 612 farthest from support 611 include recesses 613 sized to receive bearing support 640 therein (FIG. 2), as well as recesses 614 to receive retainer 660 therein as shown in FIG. 5. In addition, foundation support 610 includes openings 615 sized to receive in each opening a ROV-friendly pin 665 locking the retainer 660 in position and foundation support 610 also includes a relief surface 616 to allow for movement of SCR extension 620 and its attached parts during rotation. Detent 617 is formed in order to control the amount of material needed for the foundation by diminishing some of the material. In assembly, outer bearing assembly 640 is received in openings 613 and is then slid over its outer surface bearings 1000, which are held in place by an outer bearing retainer 1110 which is secured by bolts 1115. The foundation support 610 may also be configured to adapt to existing receptacles in lieu of attaching directly by welding or other means to the structure 300.

Figure 6A:
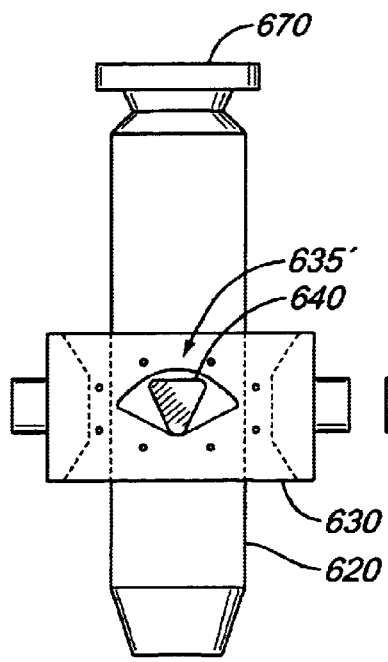
FIG. 6 depicts alternate trunnions or bearings, a higher pairing extra low friction trunnion, a bearing and a bushing subassemblies (FIGS. 6A, 6B, and 6C, respectively) for the pressure-carrying body and the trunnion adapter of the preferred embodiment of the present invention are determined.
Figure 6B:
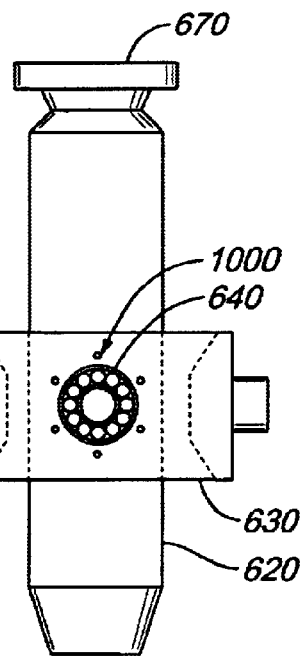
Figure 6C:
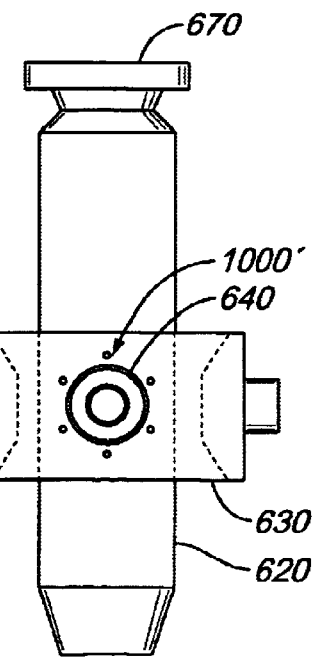

FIG. 6 depicts the various methods in which the motions of the outer trunnion adapter 630 may be accommodated. FIG. 6A is that of a higher paired, knife-edged alternative embodiment of trunnion 635' of trunnion 635 wherein the radius and contact surfaces are composed of high strength metallurgy to allow for high loads. Methods as described can provide low rotational friction values. FIG. 6B illustrates the option of a higher paired roller or low friction bearing assembly 1000. FIG. 6C illustrates the option of a standard bushing 1000' instead of bearing 1000. Further, the bearing 1000 and bushing 1000' incorporate the use of concentric and hardened segments which make the metallurgical requirements of the forging or casting less critical regarding metallurgy and hardness.

Figure 7:
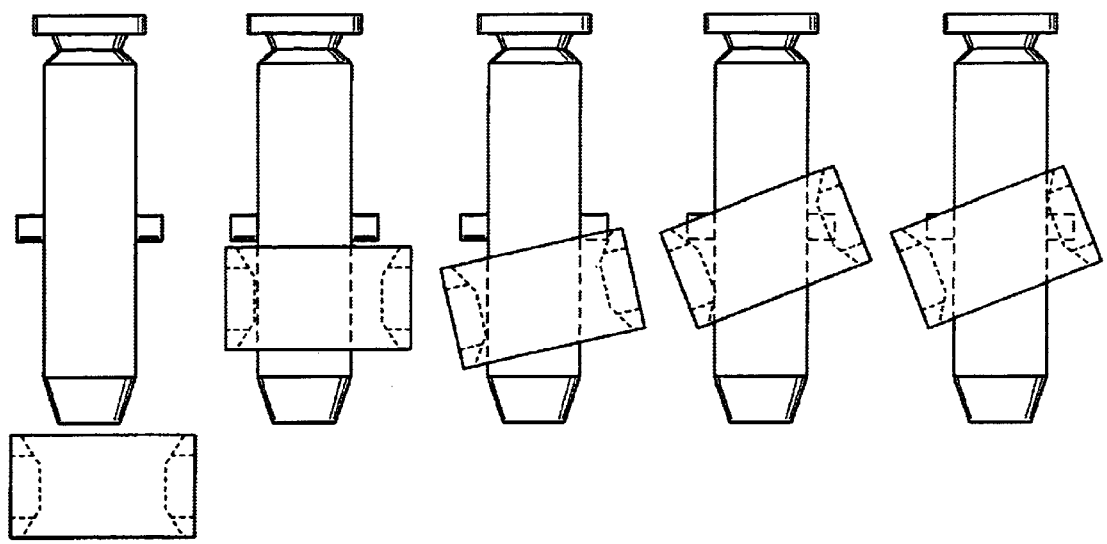
FIG. 7 depicts the manner of assembly in which the reliefs of the outer trunnion adapter 630 of the preferred embodiment of the present invention are determined.
Figure 7:
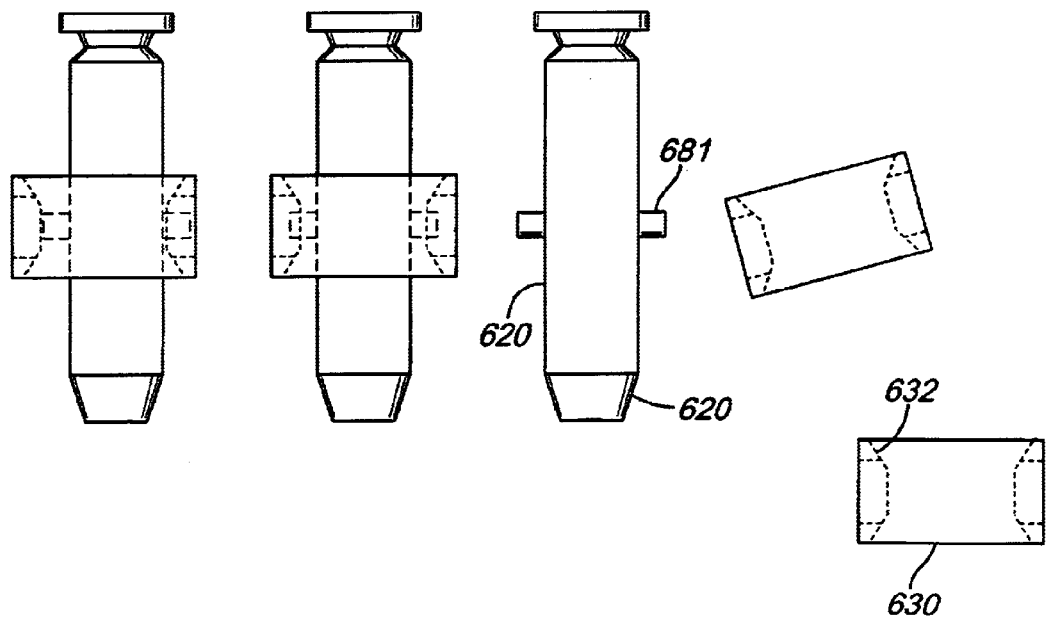

FIG. 7 shows the method of assembly of the SCR extension 620 with the outer trunnion assembly 630. The illustration depicts the manner in which the relief was determined to allow for the inner trunnion 681 to be passed into the outer trunnion 630 by providing relief in lieu of external bolted connections. FIG. 7 shows the sequence of that connection, the sequence moving from left to right as one faces the page.

Figure 8A:
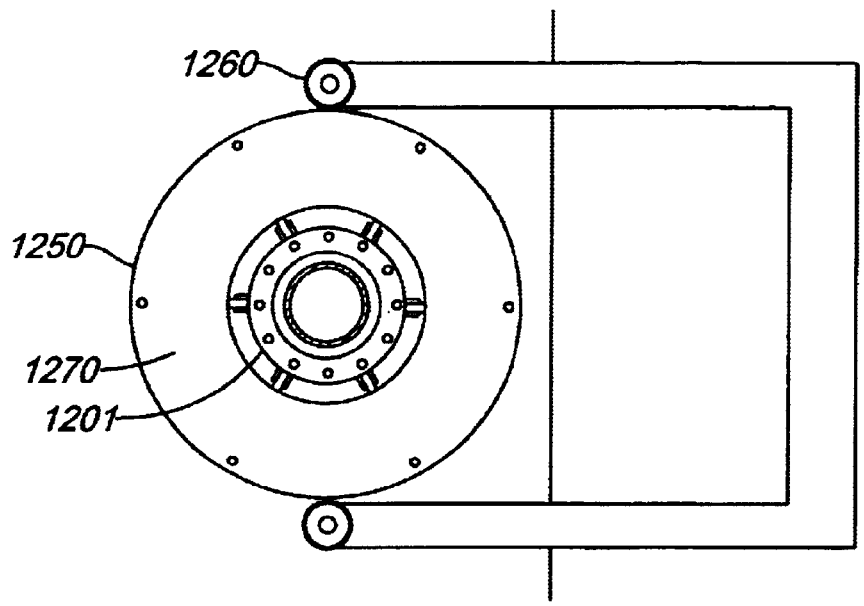
FIG. 8A, a top view.
Figure 8B:
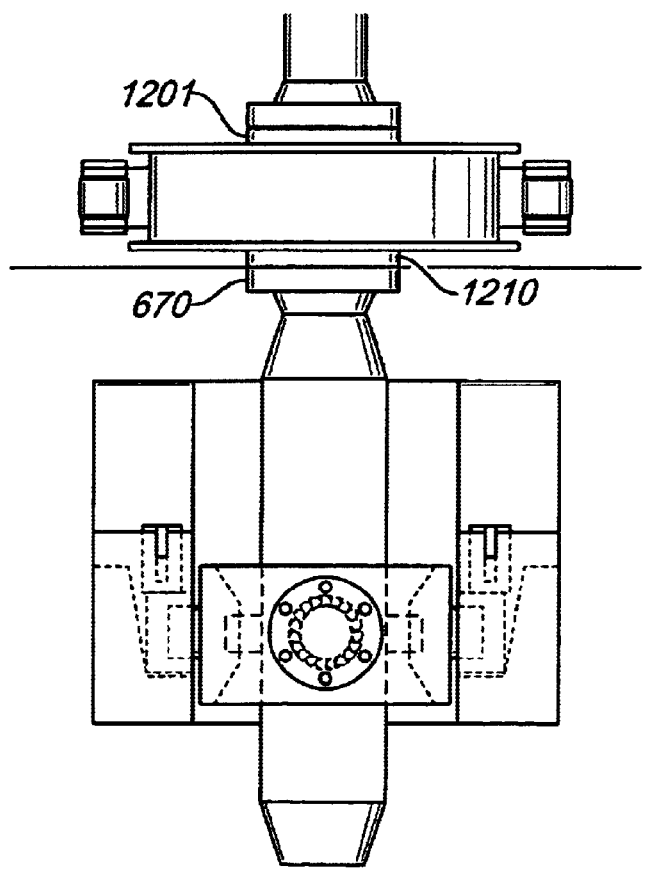
FIG. 8B, a front view.
Figure 8C:
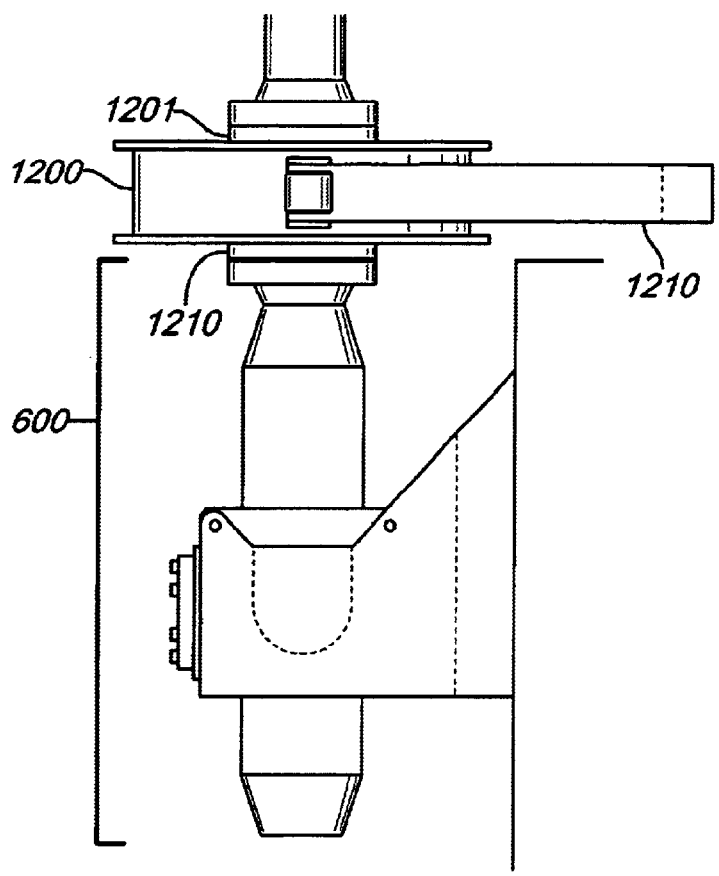
FIG. 8C, a side view.

FIG. 8 illustrates an alternative damper assembly 1200 attached above the SCR Top Connector Assembly 600 at the upper flange 670, utilizing a spacer 1210 to accommodate the thickness of the damper assembly 1200 and support 1201 which may be anchored to foundation 610 or directly to the structure 300. The top view, FIG. 8A, illustrates the support system 1201, which allows a high degree of angular movement. FIG. 8A also illustrates the top view of the damper 1200, with cover removed, identifying the outer housing 1250, the outer housing support padeyes 1260, and the spacers 1210 (FIGS. 8A and 8C), which accommodate the required diameter of the fluid swivel flange. In this case, the valve 800 would connect above the damper assembly 1200.

Figure 9A:
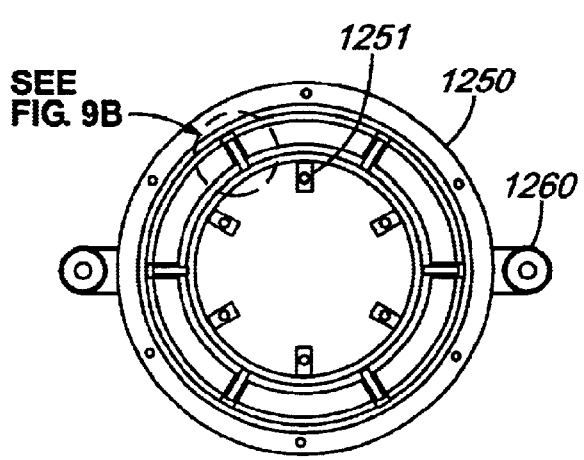
FIG. 9A depicts damper details of the preferred embodiment of the present invention.
Figure 9B:
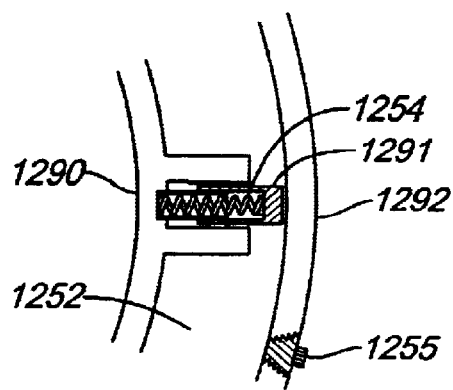
FIG. 9B depicts a detail of the preferred embodiment of the present invention.

FIG. 9 shows the top cover 1270 of outer housing 1250 removed and shows the hydraulic damper working parts without structural components for clarity. Within the annular space 1252 (FIG. 9B) formed inside outer housing 1250, seawater is admitted via ball check, or similar parts, 1255. As the central section 1290 is moved radially off center, fluid contained in the annular sections 1252 is restricted from motion due to spring 1292. The tolerance and configuration of the damping system assembly provide limited flow paths, hence differential pressure of the sides of the central section to provide a damping force to external motions.

Figure 10:
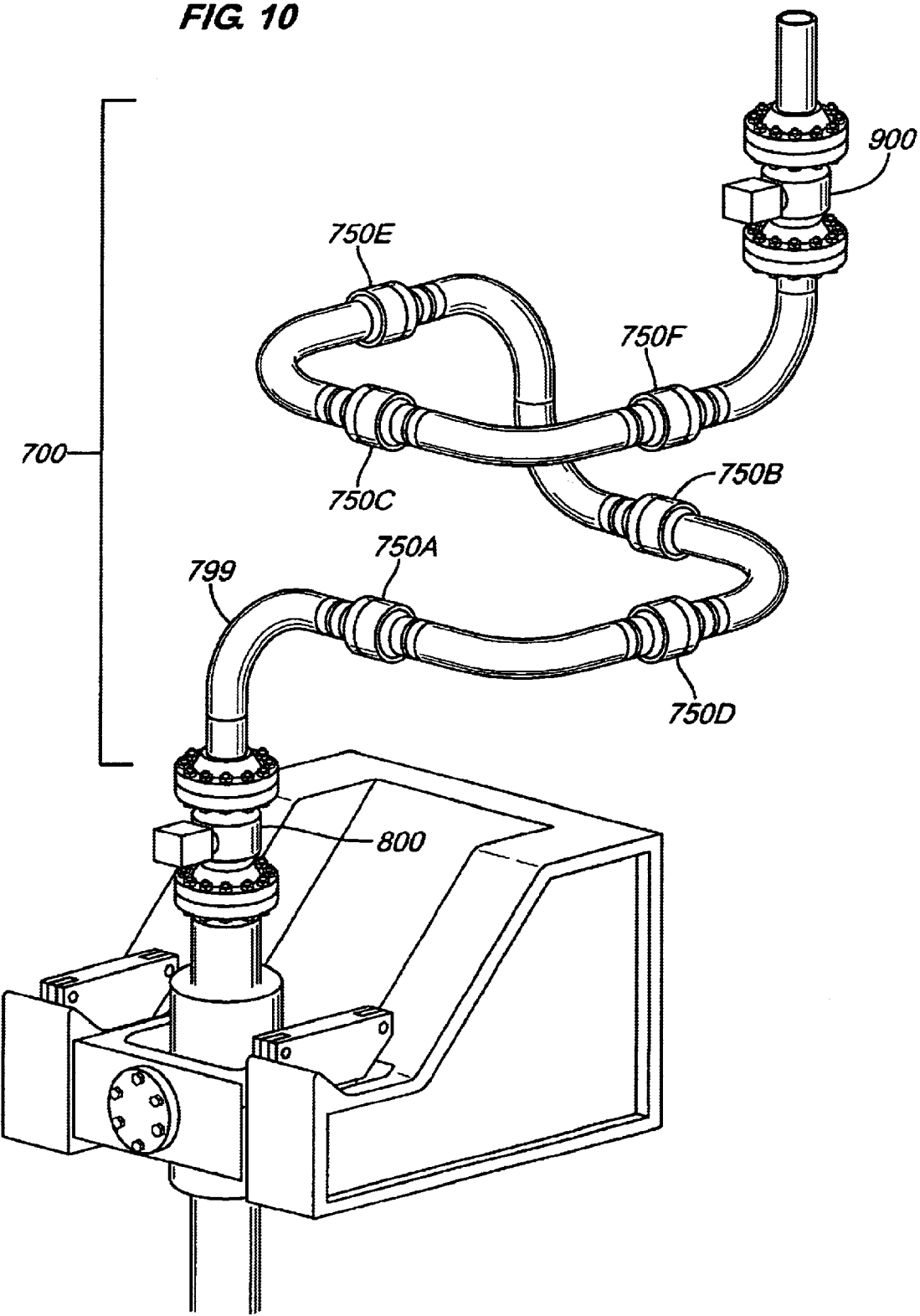
FIG. 10 depicts the Flexible Assembly incorporating a rotary swivel system arrangement of the preferred embodiment of the present invention.
Figure 11A:
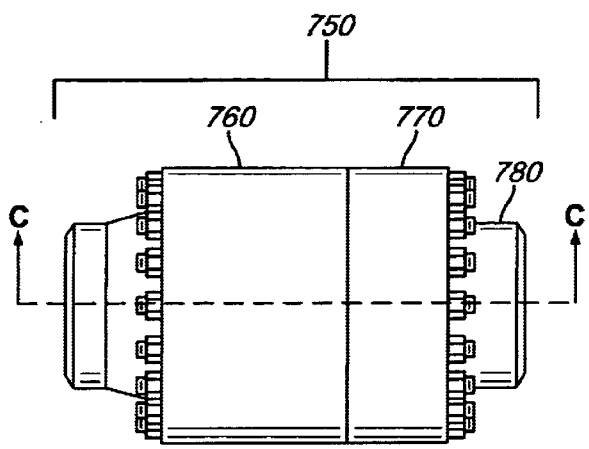
FIG. 11a depicts the side exterior of a single-seal, high-pressure rotary seal option typifying the rotary swivel system.
Figure 11B:
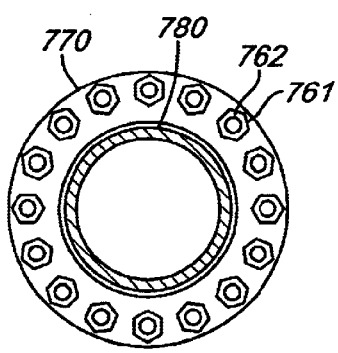
Figure 11C:
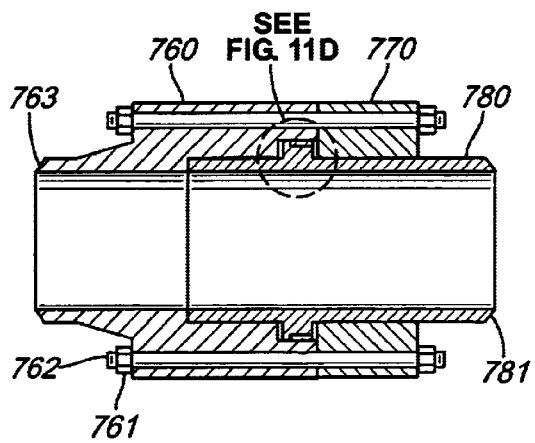
Figure 11D:
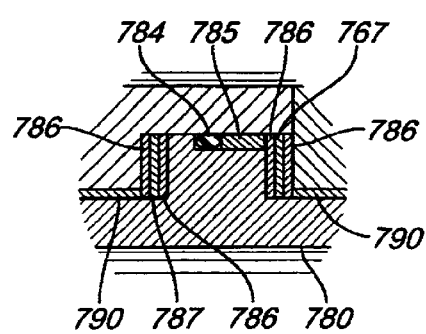
FIG. 11d is a detail of a portion of the rotary seal cross-section of FIG. 11c.

FIG. 10 shows the Flexible Assembly 700 being comprised of a rotary swivel system arrangement. The configuration, as shown, allows the upper valve 900 to remain stationary and be rigidly mounted while the lower valve 800 moves in 3D pendular manners about the orthogonal trunnions of the SCR Top Connector Assembly 600, FIG. 2. As the lower valve 800 moves during pivot motion about the outer trunnion, adapter trunnions 635 FIG. 2 and FIG. 4A, rotation is allowed in swivels 750*a*, 750*b*, and 750*c*. No rotation occurs in 750*d*, 750*e*, and 750*f*. Swivel 750*c* remains at the same global coordinates as prior to lower valve 800 motion but allows rotation. Swivel 750*a* moves as a rigid object with the lower valve 800 motion but allows rotation. The linkage formed by the two pipe segments between the swivels causes swivel 750*b* to move both vertically, laterally, and rotate due to the fixed lengths of the linkages made up by the pipe bends 799 and the inactive swivels 750*d*, 750*e*, and 750*f*.

With motion caused by the SCR extension assembly trunnions 681, FIG. 2, FIG. 3A and FIG. 3B, swivels 750*a*, 750*b*, and 750*c* do not rotate but act as rigid segments along with the pipe bends 799 which make up the linkages. Swivel 750*f* remains stationary vertically and laterally but allows rotation. Swivel 750*d* moves as a rigid body with the upper valve 800 while allowing rotation. The differential distances are accommodated by displacement and rotation of swivel 750*e*.

For combined motions, the system functions in the same manner. The configuration and use are unique to this invention and application.

FIG. 11 depicts a swivel assembly which may occupy any position in the swivel arrangement described above. Any capable swivel will suffice in a satisfactory configuration. The unique feature of this swivel is the use of only one rotary seal 784. A seal backing ring 785 is provided for assembly ease. Minor bending moments caused by pressure thrust loads on the bends 799, FIG. 10, are absorbed by the sleeve bushings 790 which extend along the outside diameter of the internal swivel body 780. The longitudinal pressure thrust loads caused by the bends 799, FIG. 10, are absorbed by the radial thrust load bushings 786, 787. The external swivel body 760 serves as one end of the attachment to the piping system at end 763 while the inner swivel body 780 attaches to the piping system at 781. The addition of added seals for testing or seals to provide assurance against seawater ingress do not compromise the features or lend claim to benefits unaware to this application.

Retainer 770 is attached to the external swivel body 760 with fasteners 761, 762, or other means to contain the Rotary Swivel Components.

Hardened systems at points of high contact stress to minimize size requirements, reduce friction, and prevent surface galling, fretting and associated surface failures may be used. Further, SCR Top Connector Assembly incorporates copper alloy components or surfaces applied by cladding, and/or electrically, mechanically, or thermal applied, for applications of seawater exposure and areas such as pivot points which must be free of crustacean and other sea growths. Further, SCR Top Connector utilizes a thick walled fluid conduit section with wall thickness transition to accommodate a wide variation of SCR or similar conduit wall and grade. Also, SCR Top Connector Assembly utilizes a conduit section which may incorporate either an integral or attached trunnion assembly to provide for variation of material properties and thickness.

SCR Top Connector Assembly utilizes a fluid containment section which incorporates a surface of low friction materials to allow rotational motion preventing alignment difficulties during installation and minimizing rotational torque of the SCR during installation thereby improving the fatigue life.

A higher paired trunnion may be used which incorporates a rocking motion with primarily rolling motion due to the utilization of essentially identical radii of the fulcrum and beam section; the components may be arranged in any manner to achieve the desired action and the materials of the trunnion may utilize coatings or cladding such as iron carbide or ceramic or non-ferrous materials to provide high wear resistance without susceptibility to corrosion.

Thus, the SCR Top Connector Swivel System transforms the pendular motions of an SCR Top Connector Load Base to three or more rotary motions allowing the distant ends of the swivel system to be fixed or sliding for thermal expansion of the attached piping system.

Other applications associated with the object of the invention includes: electrical conduit, or an umbilical attached in the manner of an SCR. These applications would utilize the object, of this invention; however, the pressure-containing component would be substitutes for a segment to accommodate the umbilical or conduit and limit the minimum radius while allowing greater installation tolerances and dynamic motions.

While the best mode and preferred embodiments of the invention have been described, it is to be understood that the invention is not limited, thereto, but rather is to be measured by the scope and spirit of the appended claims.

What is claimed is:

1. A top connector assembly for attaching a catenary riser to a sea-based platform, comprising:
   a foundation support secured to a portion of a sea-based platform, the foundation support providing a pair of recesses thereupon;
   an outer trunnion adapter that is pivotably retained upon the recesses of the foundation support to permit pivotal, pendular motion of the outer trunnion adapter with respect to the foundation support in a first plane, the outer trunnion adapter having an outer structural envelope that defines a central opening therein; and
   an inner trunnion that radially surrounds a portion of a catenary riser and is pivotably retained within the central opening of the outer trunnion adapter to permit pivotal, pendular motion of the inner trunnion and riser portion with respect to the outer trunnion adapter in a second plane.

2. The top connector assembly of claim 1 wherein the first and second planes are orthogonal to each other.

3. The top connector assembly of claim 1 wherein the outer trunnion adapter includes a pair of laterally-extending bearing supports that are shaped and sized to reside within said recesses in the foundation support.

4. The top connector assembly of claim 3 wherein the bearing supports each comprise a, knife-edge bearing member.

5. The top connector assembly of claim 3 wherein the bearing supports each comprise a roller bearing.

6. The top connector assembly of claim 3 wherein the bearing supports each comprise a bushing.

7. The top connector assembly of claim 3 wherein:
the outer trunnion adapter further comprises a pair of reliefs that are sized to receive complimentary bearing supports therein; and
the inner trunnion further comprises a pair of laterally extending bearing supports that are received within the reliefs of the outer trunnion adapter to provide pivotal, pendular motion of the inner trunnion with respect to the outer trunnion adapter by rotation of the inner trunnion bearing supports within the reliefs.

8. The top connector assembly of claim 1 wherein the inner trunnion is rotationally mounted to a portion of a catenary riser to permit the riser portion to rotate within the inner trunnion.

9. The top connector assembly of claim 1 wherein the inner trunnion is formed as an integral component with a riser portion.

10. The top connector assembly of claim 1 further comprising a damper assembly extending from said sea-based platform for engaging a portion of a catenary riser to damp motion of the riser.

11. The top connector assembly of claim 1 further comprising a flexible assembly for connecting an end of a catenary riser that is affixed to the inner trunnion to a valve, the flexible assembly comprising a plurality of curved pipe bends that are interconnected by swivels to accommodate motion of the end of the catenary riser.

12. A top connector assembly for attaching a catenary riser to a sea-based platform, comprising:
a) a foundation support secured to a portion of a sea-based platform, the foundation support providing a pair of lateral support portions, each of the lateral support portions having a recess thereupon;
b) an outer trunnion adapter that is pivotably retained upon the recesses of the foundation support to permit pivotal, pendular motion of the outer trunnion adapter with respect to the foundation support in a first plane, the outer trunnion adapter comprising:
1) an outer structural envelope that defines a central opening therein,
2) a pair of reliefs formed within the central opening and being sized to receive a bearing support, and
3) a pair of bearing supports that project outwardly from the outer structural envelope;
c) an inner trunnion that is pivotably retained within the central opening of the outer trunnion adapter to permit pivotal, pendular motion of the inner trunnion and riser portion with respect to the outer trunnion adapter in a second plane, the inner trunnion comprising:
1) a housing that radially surrounds a portion of a catenary riser, and
2) a pair of bearing supports that are sized to reside within the reliefs of the outer trunnion adapter.

13. The top connector assembly of claim 12 further comprising a damping assembly extending from said sea-based platform for engaging a portion of a catenary riser to damp motion of the riser.

14. The top connector assembly of claim 13 wherein the damping assembly comprises a hydraulic damping mechanism.

15. The top connector assembly of claim 12 further comprising a flexible assembly for connecting an end of a catenary riser that is affixed to the inner trunnion to a valve, the flexible assembly comprising a plurality of curved pipe bends that are interconnected by swivels to accommodate motion of the end of the catenary riser.

16. The top connector assembly of claim 12 wherein the bearing supports of said outer trunnion adapter each comprise a knife-edge bearing member.

17. The top connector assembly of claim 12 wherein the bearing supports of said outer trunnion adapter each comprise a roller bearing.

18. The top connector assembly of claim 12 wherein the bearing supports of said outer trunnion adapter each comprise a bushing.

19. A top connector assembly for attaching a catenary riser to a sea-based platform, comprising:
a foundation support secured to a portion of a sea-based platform;
a load-bearing support joint for securing a riser to the foundation support, the load-bearing support joint permitting pivotal pendular motion of the riser in orthogonal planes; and
a flexible assembly for connecting an end of a catenary riser to a valve, the flexible assembly comprising a plurality of curved pipe bends that are interconnected by swivels to accommodate motion of the end of the catenary riser.

20. The top connector assembly of claim 19 wherein the load bearing support joint further permits rotational motion of a riser.

* * * * *